(12) United States Patent
Yemm et al.

(10) Patent No.: US 9,018,779 B2
(45) Date of Patent: Apr. 28, 2015

(54) APPARATUS FOR EXTRACTING POWER FROM WAVES

(75) Inventors: Richard Yemm, Edinburgh (GB); Ross McKay Henderson, Edinburgh (GB)

(73) Assignee: Pelamis Wave Power Limited, Edinburgh (GB)

( * ) Notice: Subject to any disclaimer, the term of this patent is extended or adjusted under 35 U.S.C. 154(b) by 312 days.

(21) Appl. No.: 13/510,369

(22) PCT Filed: Nov. 22, 2010

(86) PCT No.: PCT/GB2010/051934
§ 371 (c)(1),
(2), (4) Date: Jul. 13, 2012

(87) PCT Pub. No.: WO2011/061546
PCT Pub. Date: May 26, 2011

(65) Prior Publication Data
US 2013/0239562 A1     Sep. 19, 2013

(30) Foreign Application Priority Data

Nov. 20, 2009   (GB) .................................. 0920310.1

(51) Int. Cl.
*F03B 13/20*     (2006.01)
(52) U.S. Cl.
CPC ........... *F03B 13/20* (2013.01); *F05B 2260/406* (2013.01); *Y02E 10/38* (2013.01)
(58) Field of Classification Search
CPC ........... F03B 13/20; F03B 13/14; F03B 13/18
USPC ............. 290/42, 53; 114/230.12, 293; 60/501
See application file for complete search history.

(56) References Cited

U.S. PATENT DOCUMENTS

| | | | | |
|---|---|---|---|---|
| 882,883 A * | 3/1908 | Hillson | ............................ | 60/500 |
| 917,411 A * | 4/1909 | Casella | ............................ | 60/500 |
| 1,018,678 A * | 2/1912 | Nelson | ............................ | 290/4 D |
| 1,078,323 A * | 11/1913 | Trull | ............................ | 417/332 |
| 3,758,788 A * | 9/1973 | Richeson | ........................ | 290/42 |

(Continued)

FOREIGN PATENT DOCUMENTS

| | | |
|---|---|---|
| GB | 2363431 A | 12/2001 |
| GB | 2433553 A | 6/2007 |

(Continued)

OTHER PUBLICATIONS

Brandt, Isabelle, "International Search Report" for PCT/GB2010/051934, as mailed Oct. 25, 2011, 4 pages.

*Primary Examiner* — Thomas Denion
*Assistant Examiner* — Shafiq Mian
(74) *Attorney, Agent, or Firm* — Marshall, Gerstein & Borun LLP

(57) ABSTRACT

An improved apparatus for extracting power from waves is provided. The apparatus (10) comprises at least one pair of buoyant body members (12A,12B) connected to one another by a coupling (14) which permits relative rotation between the body members (12A,12B) about first and second non-parallel axes of rotation (A,B). The apparatus further comprises a power extraction system comprising at least one power extraction element (16) having a first end connected to a first of the body members (12A) and a second end connected to a second of the body members (12B) such that the element resists and extracts power from the relative rotation between the body members (12A,12B).

18 Claims, 6 Drawing Sheets

(56) References Cited

U.S. PATENT DOCUMENTS

| | | | | |
|---|---|---|---|---|
| 3,818,523 | A * | 6/1974 | Stillman, Jr. | 441/22 |
| 4,077,213 | A * | 3/1978 | Hagen | 60/500 |
| 4,098,084 | A * | 7/1978 | Cockerell | 60/500 |
| 4,118,932 | A * | 10/1978 | Sivill | 60/500 |
| 4,389,843 | A * | 6/1983 | Lamberti | 60/507 |
| 4,392,349 | A * | 7/1983 | Hagen | 60/500 |
| 4,686,377 | A * | 8/1987 | Gargos | 290/53 |
| 4,781,023 | A * | 11/1988 | Gordon | 60/506 |
| 4,792,290 | A * | 12/1988 | Berg | 417/332 |
| 4,881,210 | A * | 11/1989 | Myers et al. | 367/173 |
| 7,315,092 | B2 * | 1/2008 | Cook | 290/53 |
| 7,443,045 | B2 * | 10/2008 | Yemm | 290/42 |
| 7,443,047 | B2 * | 10/2008 | Ottersen | 290/53 |
| 7,474,013 | B2 * | 1/2009 | Greenspan et al. | 290/53 |
| 8,358,025 | B2 * | 1/2013 | Hogmoe | 290/53 |
| 2009/0066085 | A1 * | 3/2009 | Gray | 290/42 |
| 2009/0243293 | A1 * | 10/2009 | Farb | 290/42 |
| 2009/0284015 | A1 * | 11/2009 | Sack | 290/53 |
| 2010/0026000 | A1 * | 2/2010 | Hogmoe | 290/53 |
| 2010/0038913 | A1 * | 2/2010 | Svelund | 290/53 |
| 2011/0057448 | A1 * | 3/2011 | Page | 290/53 |

FOREIGN PATENT DOCUMENTS

| | | |
|---|---|---|
| WO | WO-00/17519 A1 | 3/2000 |
| WO | WO-2004/088129 A1 | 10/2004 |
| WO | WO-2009/112597 A1 | 9/2009 |
| WO | WO-2010/015043 A1 | 2/2010 |

* cited by examiner

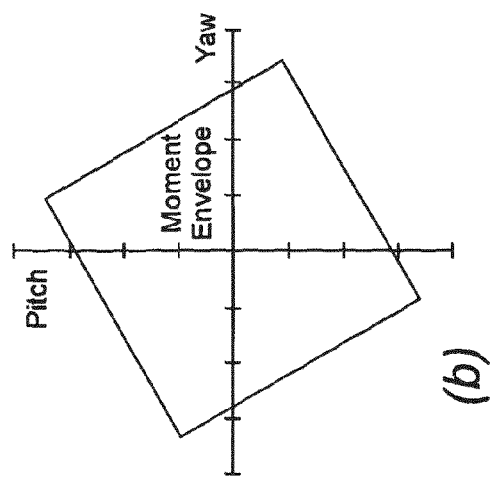
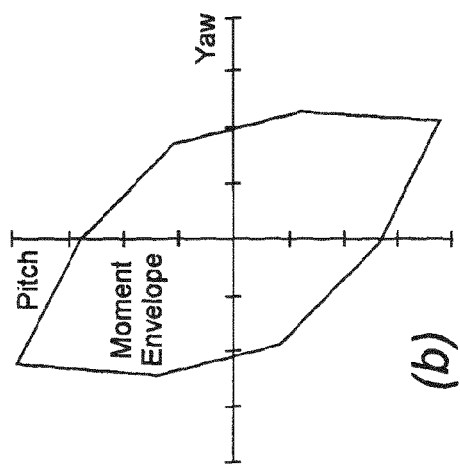
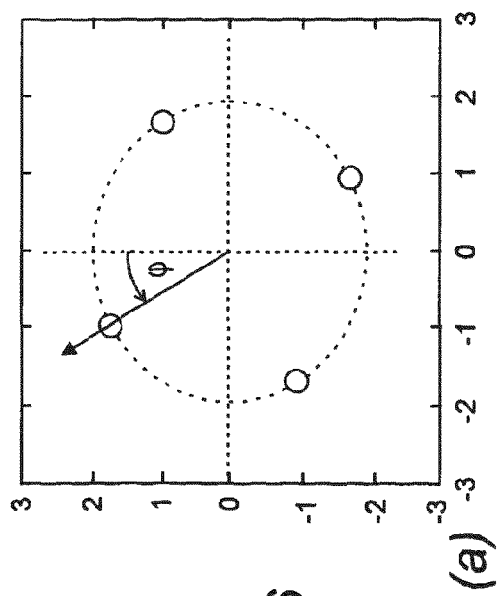
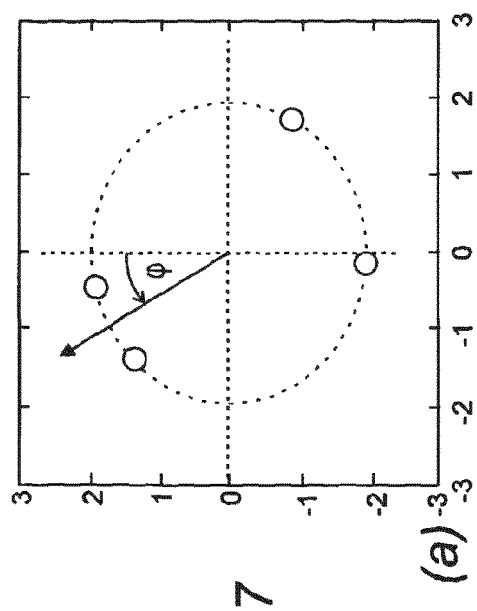
Fig. 6
Fig. 7

APPARATUS FOR EXTRACTING POWER FROM WAVES

The present invention is directed to an improved apparatus for extracting power from waves.

Ocean waves represent a significant energy resource. It is known to use an apparatus such as a wave energy converter to extract power from those waves. WO00/17519 to the same applicant describes an apparatus and method for extracting power from ocean waves. In this design the apparatus comprises a number of buoyant cylindrical body members connected at their ends to form an articulated chain-like structure. Each pair of adjacent cylindrical members is directly connected together by coupling members which permit relative rotation of the cylindrical members about either a single axis of rotation or about two axes of rotation which are mutually orthogonal.

WO2004/088129 also to the same applicant describes a wave energy converter with a separate linkage unit providing a connection between each pair of body members. This linkage unit permits relative rotation at either end of the unit, with power extraction means housed within it. The linkage unit is arranged to permit relative rotation between it and a first body member about a first axis of rotation and to permit relative rotation about it and a second body member about a second axis of rotation. The first and second axes are orthogonal.

In both of these previous proposals the power extraction means employed comprises a plurality of hydraulic ram assemblies and a hydraulic power circuit. In the embodiments where the coupling member or linkage unit provides a joint having two degrees of freedom (i.e. two mutually orthogonal axes of rotation) one end of each ram is connected to the power circuit whilst the other end of the ram is connected to the coupling member or linkage unit. Thus, each ram only spans a single axis of rotation at the joint.

According to the present invention, there is provided an apparatus for extracting power from waves, the apparatus comprising:

at least one pair of buoyant body members connected to one another by a coupling which permits relative rotation between the body members about first and second non-parallel axes of rotation; and a power extraction system comprising at least one power extraction element having a first end connected to a first of the body members and a second end connected to a second of the body members such that the element resists and extracts power from the relative rotation between the body members.

The power extraction element may be a hydraulic ram assembly having a piston rod and a cylinder, and wherein the cylinder is connected to the first body member and the piston rod is connected to the second body member. Each body member has a longitudinal axis, and the cylinder and piston rod may be connected to their respective body members such that relative axial movement is prevented between the cylinder and first body member and between the piston rod and the second body member.

Alternatively, the power extraction element may be a linear motor.

The power extraction system may comprise a plurality of power extraction elements, each element having a first end connected to the first body member and a second end connected to the second body member.

The power extraction system may comprise first and second pairs of power extraction elements, wherein the first and second pairs of elements are respectively located either side of the first axis of rotation and are symmetrical with respect to the second axis of rotation. The lateral distance between the first pair of elements may be less than the lateral distance between the second pair of elements.

The apparatus may further comprise:

a plurality of body members, wherein each pair of adjacent body members are connected to one another by a coupling which permits relative rotation between the body members about two non-parallel axes of rotation; and a power extraction system for each coupling.

Each coupled pair of body members comprises a front body member and a rear body member, and the power extraction system may be located in the front body member of each coupled pair.

The coupling may comprise a plate member located between the pair of body members, the plate member being rotatably connected to the first body member about a first axis of rotation, and rotatably connected to the second body member about a second axis of rotation which is substantially perpendicular to the first axis of rotation.

The plate member may include an aperture and the apparatus may further comprise at least one cabling conduit connecting the body members through the aperture. The aperture may be co-axial with the longitudinal axis of the apparatus.

The plate member may be connected to each of the pair of body members by one or more pivot pins lying in the respective axes of rotation.

Each of the first and second ends of the or each extraction element may be connected to its respective body member such that the first and second ends may each rotate relative to their respective body members about third and fourth axes of rotation.

The third axis of rotation may be substantially orthogonal to the second axis of rotation, and the second end of the or each power extraction element may be pivotably connected to the second body member about the third axis of rotation.

The connections between the respective body members and the coupling may be covered by protective bellows.

A preferred embodiment of the present invention will now be described, by way of example only, with reference to the accompanying drawings. The drawings illustrate the following:

FIGS. 6(a) and 6(b) and 7(a) and 7(b) illustrate the comparative positions of power extraction elements in a prior art apparatus versus the present invention, and the resultant changes to the moment envelope available in each apparatus.

Figure 1:
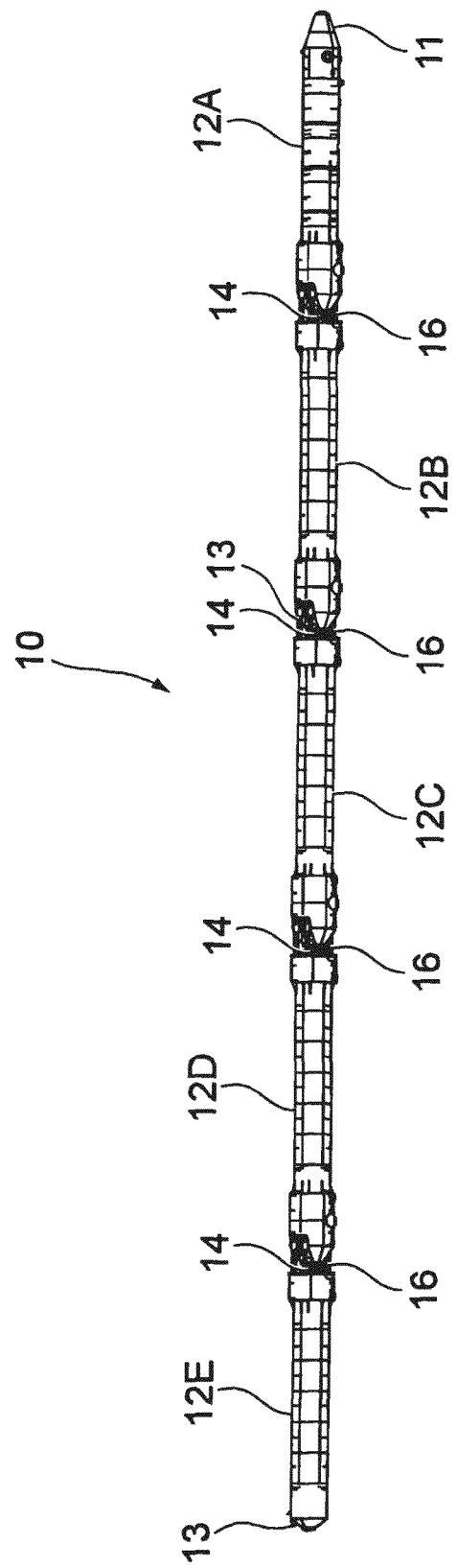
FIG. 1 is a side view of an apparatus for extracting power from waves.

Referring to FIG. 1, there is shown an apparatus for extracting power from waves. The apparatus, generally designated 10, comprises two or more buoyant body members 12A-E, which are connected to one another by couplings 14 having two degrees of freedom. In other words, each coupling 14 permits relative rotation of an adjacent pair of body members 12A-E about two axes of rotation, which are non-parallel and are preferably substantially orthogonal. At least one power extraction element 16 is connected across each coupling 14 between an adjacent pair of body members 12A-E. The power extraction element 16 resists the relative movements between the body members 12A-E and extracts power therefrom. This will be described in further detail below.

The body members 12A-E may be shaped in a certain way in order to influence the hydrodynamic characteristics of the apparatus. For example, the front body member 12A may include a conical nose 11 to minimise drag in extreme seas, while each body member 12A-E may have a longitudinally projecting rear face 13 to increase damping along the longitudinal axis of the apparatus 10.

Figure 2:
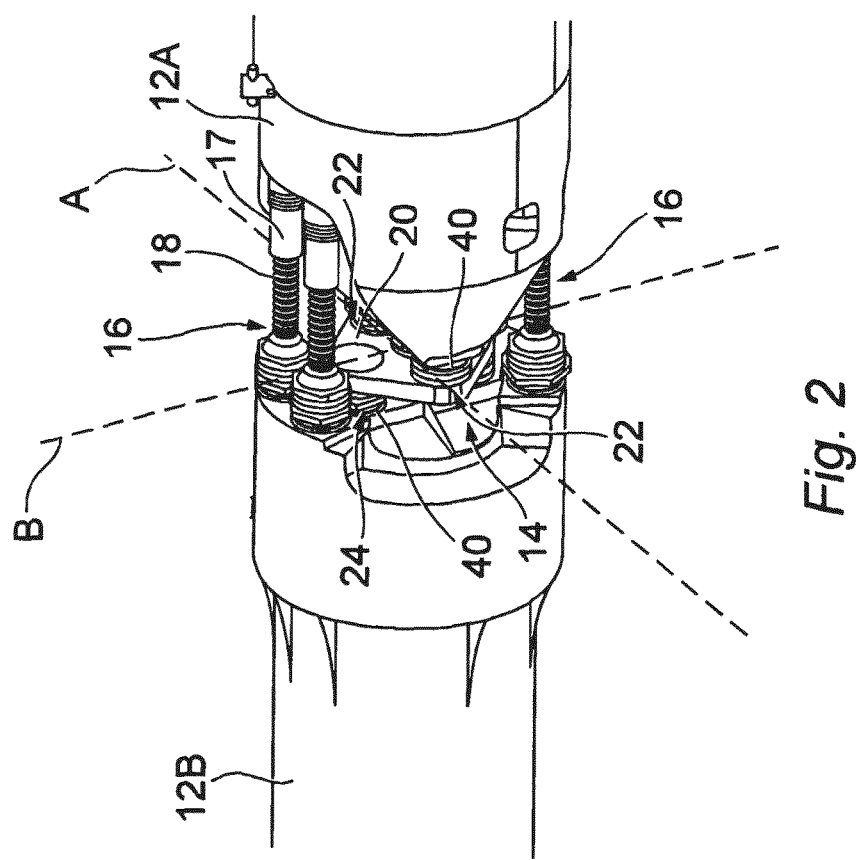
FIG. 2 is a perspective view of a joint between two body members of the apparatus of FIG. 1.

FIG. 2 illustrates the joint between adjacent body members 12A,12B in more detail. The coupling 14 comprises a plate member 20 which is located between the two body members 12A,12B and which is rotatably connected to the body members 12A,12B by first and second pairs of connections 22,24. The first and second connections 22,24 permit relative rotation between the plate 20 and the body members 12A,12B along first and second axes of rotation A,B, respectively. The axes of rotation A,B are preferably orthogonal. Each connection 22,24 is covered by a protective bellows 40.

FIG. 2 also shows the power extraction elements 16 in more detail. These elements 16 are preferably hydraulic rams as shown in the figure. A first end of the ram incorporating the ram cylinder 17 is attached to the rear of the first body member 12A and is connected to a power extraction system or circuit (not shown) housed within the first body member 12A. The ram cylinder 17 is connected to the first body member 12A such that relative axial movement between the two parallel to the longitudinal axis of the body member 12A is prevented. The opposite, second end of the ram incorporating the ram piston rod 18 is attached to the front of the second body member 12B. The piston rod 18 is connected to the second body member 12B such that relative axial movement between the two parallel to the longitudinal axis of the body member 12B is prevented. Thus, relative rotation between the first and second body members 12A,12B will slide the piston rod 18 and associated piston (not shown) within the ram cylinder 17, thereby causing hydraulic fluid to flow between the extraction system and the cylinder 17. In the preferred embodiment illustrated, four extraction elements 16 are connected between the two body members 12A,12B, although one is hidden in FIG. 2. It should also be noted that the ram connections and pistons are covered by protective bellows in FIG. 2.

The power extraction system housed within the first body member 12A will not be described here in more detail, but systems which would be suitable for use in the present invention are described and illustrated in both WO00/17519 and WO2004/088129 to the same applicant.

Figure 3:
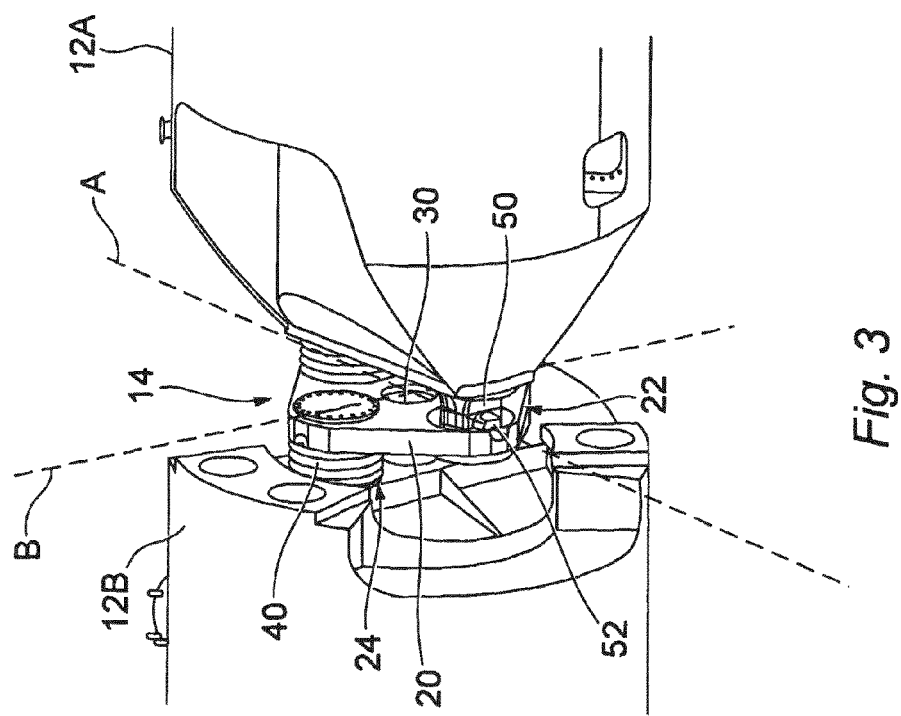
FIGS. 3 and 4 are enlarged views of the joint shown in FIG. 2.

FIG. 3 shows the coupling 14 in more detail with the hydraulic rams removed for illustrative purposes. An aperture 30 can be seen extending through the plate 20. The aperture 30 is preferably co-axial with the longitudinal axes of the body members 12A,12B, and is adapted to receive one or more conduits (not shown) carrying cables and connections from the first body member 12A to the second 12B. When co-axial with the longitudinal axes of the body members 12A,12B, the aperture 30 reduces the amount of stress and strain applied to the conduit and cables housed therein as they are located on the neutral axis of the apparatus where relative movements are minimised.

Also in FIG. 3 one of the protective bellows 40 has been removed from one of the first connections 22 to show the connection 22 in more detail. The connection 22 comprises a lug 50 which projects from the rear of the first body member 12A in a direction substantially parallel to the longitudinal axis of the apparatus. Extending radially outwards from opposing sides of the lug 50 are a pair of pivot pins 52, which define the first axis of rotation A as described above. The connection 22 also comprises a bearing assembly (not shown) housed within the plate 20 into which the pivot pins 52 locate. Consequently, the first pair of connections 22 permit the body member 12A and the plate 20 to pivot relative to one another about axis A. The second pair of connections 24 are formed in substantially the same manner, with the lugs this time projecting from the front of the second body member 12B. However, the pivot pins in the second connections 24 project radially from their lugs in a direction preferably perpendicular to that of the pins in the first connections 22. The pins extending from the second body member 12B thus define the second axis of rotation B, which is preferably substantially perpendicular to the first axis of rotation A. The second pair of connections 24 permit the body member 12B and the plate 20 to pivot relative to one another about axis B.

Figure 4:
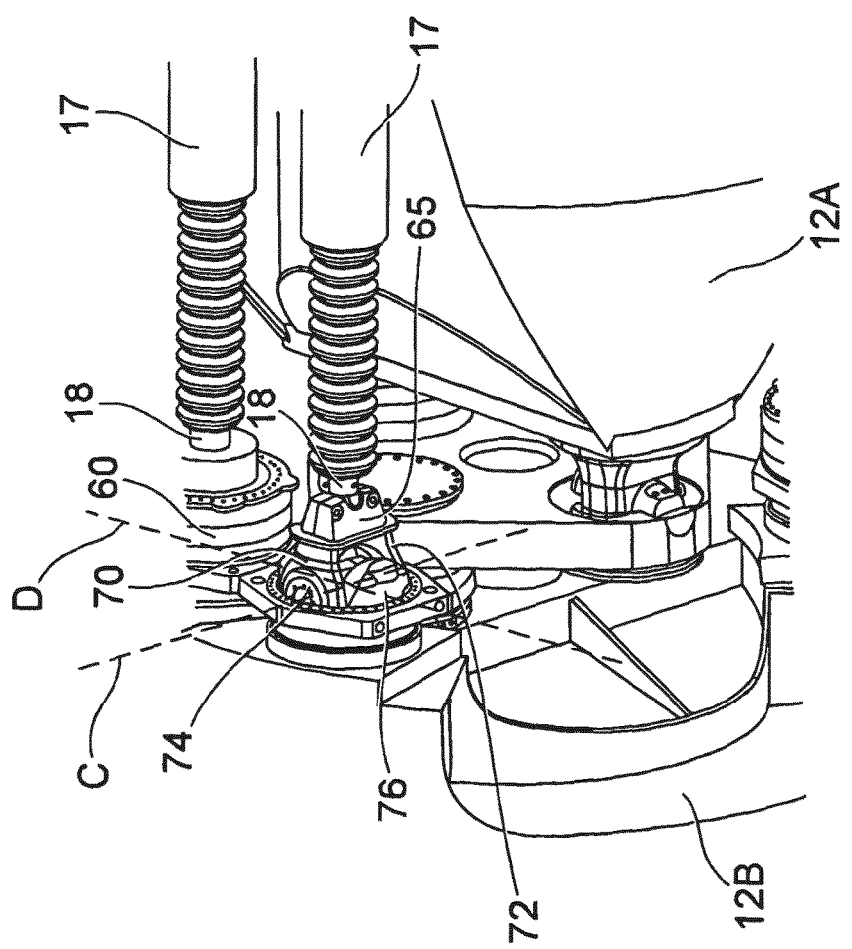

In FIG. 4 the hydraulic rams have been reinstated so as to illustrate how they may be attached to the second body member 12B. Again, a protective bellows 60 is usually located over the attachment but one has been removed for illustrative purposes in FIG. 4. Fixed to the free end of the piston rod 18 is a clevis fork 65, which has two substantially parallel flanges 70,72 extending in a longitudinal direction away from the rod 18. Each flange 70,72 includes an aperture adapted to receive a pivot linkage member. The pivot linkage member is a substantially cross-shaped member made up of two integrally formed and substantially perpendicular pivot pins. For ease of reference the pins of the linkage will be referred to here as "vertical" and "horizontal", but it will be appreciated that the pins themselves are not necessarily in the vertical and horizontal orientation when the apparatus is in use.

The ends of the vertical pin of the linkage member locate in the apertures on either flange 70,72 of the fork 65. They are rotatably supported by bearing assemblies 74 (only the upper assembly is visible in FIG. 4). The ends of the horizontal pin of the linkage member connect to the second body member 12B and are rotatably supported by a second pair of bearing assemblies 76. The free end of the piston rod 18 is thus axially fixed relative to the second body member 12B as described above but can undergo rotation relative to the second body member 12B about two axes of rotation C,D defined by the vertical and horizontal pins of the linkage member. Although not shown in the figures, the cylinder 17 of each ram assembly is attached to the first body member 12A by way of a ball joint which axially fixes the cylinder 17 relative to the first body member 12A but which allows relative rotation between the cylinder 17 and first body member 12A about axes parallel to the axes C,D defined by the pins of the linkage member at the end of the piston rod 18. To prevent roll, the ball joint is restricted from allowing relative rotational motion of the cylinder 17 and first body member 12A about the longitudinal axis of the ram.

Referring to both FIGS. 2 and 4, it can be seen that the second body member 12B can rotate relative to the plate 20 and the piston rod 18 about rotational axes B and D, respectively. Axes C and D are substantially parallel to axes B and A, respectively, and consequently the axes B and D are orthogonal. Connecting the second body member 12B and piston rod 18 about an axis D which is orthogonal to axis B means that relative twisting between adjacent body members 12 resulting from the combined angles of the coupling 14 is substantially reduced. A relative twist induced at the end of the piston rod 18 by the clevis fork arrangement 65 is in the opposite direction to that induced at the connections 24 between the second body member 12B and the plate 20 for a given angle combination. Thus the relative twist between the cylinder 17 and piston rod 18 of each ram is substantially reduced, with a resultant reduction in fatigue on the protective bellows of the extraction elements 16.

Figure 5:
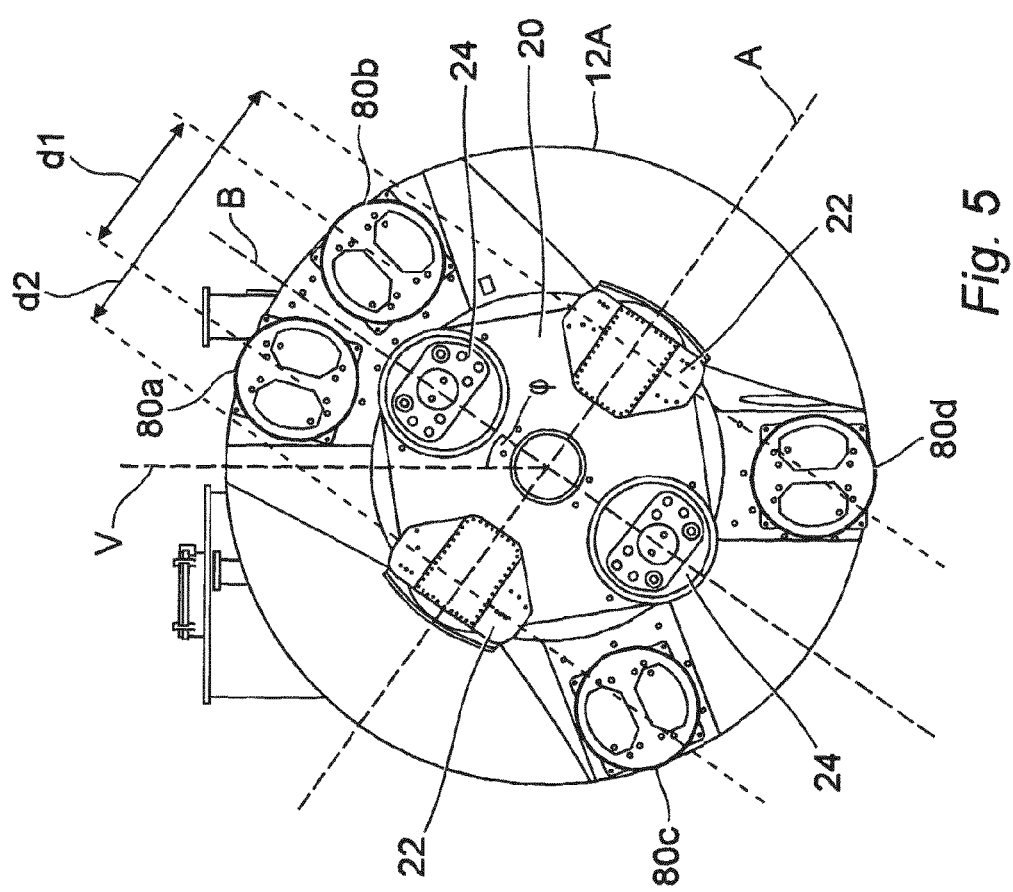
FIG. 5 is an end view of one of the body members.

FIG. 5 is an end view of the rear of the first body member 12A with the plate 20 and connections 22,24 in place. The rams are again removed for illustrative purposes. FIG. 5 shows the substantially perpendicular first and second axes of rotation A,B discussed above, as well as a roll bias angle φ applied to each body member 12A-E relative to the vertical V. The roll bias angle φ is achieved by mooring or ballasting the apparatus, and is utilised to generate a cross-coupling of the heave and sway motions experienced by the apparatus in response to wave forces. The apparatus may optionally be provided with an active or passive ballasting system which may vary the roll bias angle φ as required. Such a ballasting system will not be described here in detail, but a system which may be incorporated into the apparatus of the present invention is disclosed in WO00/17519.

Varying the roll bias angle influences the magnitude of the coupled, self excited response. The ballasting system may therefore be used in conjunction with a mooring system to vary the overall roll bias angle. The roll bias angle is selected to achieve the maximum coupled response of the converter around the frequency of interest. Criteria which influence the selection of the roll bias angle include the length and diameter of the apparatus, the mean wave period at the site where the apparatus is to be deployed, and the nature of the power extraction elements applied at the joints.

FIG. 5 also illustrates the preferred positions of the power extraction elements through the position of ram attachment portions 80 on the first body member 12A. The extraction elements are divided into pairs, with a first, or "upper", pair of elements positioned above the first axis of rotation A and illustrated by the position of attachment portions 80a,80b. A second, or "lower" pair of elements are positioned below the first axis of rotation A, as illustrated by the position of attachment portions 80c,80d. As can be seen through the position of the attachment portions 80, each pair of extraction elements is symmetrical with respect to the second axis of rotation B. In other words, the position of the attachment portions 80a,80c and their associated elements is mirrored on the other side of the axis B by attachment portions 80b,80d and their associated elements. The upper pair of extraction elements are located closer to one another than the lower pair of elements. This is illustrated in FIG. 5 by a lateral distance d1 between the centre points of the upper attachment portions 80a,80b along a line parallel to the first axis of rotation A being less than a lateral distance d2 between the centre points of the lower attachment portions 80c,80d along a line parallel to the first axis of rotation A.

For optimum collection of power, the power extraction system preferably includes hydraulic accumulators sized to provide adequate smoothing of the wave-by-wave input of power from each pair of coupled body members. The extraction elements pump high pressure oil directly into the hydraulic accumulators, via piloted outlet valves. The high pressure oil then flows out via pilot valves to variable displacement hydraulic motors which drive an electrical generator connected directly to the grid. Thus power is extracted from the apparatus directly by converting the relative motion of adjacent body members into electricity.

It can thus be seen that the relative damping applied to adjacent joints, in conjunction with selection of the roll bias angle (φ), stimulates a tunable pseudo-resonant response allowing maximum power absorption from a given sea state. Control of the magnitude of the differential restraint provides a gain control which can be set in small waves to maximise efficiency of and the power extracted by the converter, and in large waves to limit the response and thus improve the survivability of the converter.

The maximum moment that can be applied by the extraction elements about the joint varies with the direction of that applied moment. Plotting the maximum moment as a function of direction gives a moment envelope in terms of the two angular degrees of freedom at the joint. FIG. 6(b) shows the regular shape of the moment envelope resulting from positioning a first pair of extraction elements 16a,16b and a second pair of extraction elements 16c,16d on orthogonal axes, as is known in the art and illustrated schematically in FIG. 6(a). The origin represents the longitudinal axis of the apparatus when at rest. The roll bias angle φ is shown. The result is a rectangular moment envelope as shown in FIG. 6(b), and this is a square if the actuators are identical in force range and placed at the same radial distance from the longitudinal axis.

FIGS. 7(a) and 7(b) show how the present invention can yield a moment envelope better suited to the application. The preferred position of the first pairs of elements 16a,16b relative to the second pair of elements 16c,16d is again shown schematically in FIG. 7(a). The resultant moment envelope shown in FIG. 7(b) shows that the apparatus can provide a greater range of moment in one direction than the other although the actuators can be the same throughout.

For the known arrangement shown in FIGS. 6(a) and 6(b) to produce the modified moment envelope shown in FIG. 7(b) would require the replacement of at least some of the extraction elements with those of a different size. Alternatively, one or more of the elements may be repositioned to achieve the modified moment envelope. However, each element in the known arrangement shown in FIG. 6(a) is connected between a body member and the coupling rather than directly between the first and second body members as in the present invention. This means that in the known arrangement the pairs of elements cannot be repositioned circumferentially as they must to remain in the orthogonal arrangement shown in FIG. 6(a), so the only option is for some of the extraction elements to be repositioned at a closer radial distance to the longitudinal axis of the apparatus. However, repositioning some elements in this way reduces the structural efficiency of the apparatus, as the elements should ideally remain at the furthest radial position available relative to the longitudinal axis to maximize the range of movement available to the extraction elements.

The apparatus of the present invention provides a coupling between adjacent body members which has two degrees of freedom and power extraction elements which span the coupling and connect directly to the adjacent body members. As a result, the extraction elements may be positioned at any circumferential location about the longitudinal axis of the apparatus. The extraction elements can thus be positioned so as to provide a greater combined moment application in one direction of joint motion without the need to use extraction elements of different sizes or reduce the radial distance of certain extraction elements relative to the longitudinal axis with the consequent reduction in efficiency. Using extraction elements of the same size has benefits in terms of both time and cost of manufacture, as tooling will be the same for each extraction element. As explained above, being able to keep the elements at the furthest possible radial distance from the longitudinal, or neutral, axis of the apparatus ensures that the structural efficiency of the apparatus is not compromised.

Having the first and second ends of each element directly connected to the respective body members so as to span each joint, rather than being connected to the intermediate coupling, also allows the apparatus of the present invention to have the components of the power extraction system all on one side of each joint. This means that the there is less energy loss from the extraction elements to the extraction system as they can be positioned very close to one another. In addition, it means that components of the extraction system can be assembled and installed as a module in each body member, rather than having components either side of each coupling.

Whilst the preferred power extraction system is a hydraulic system employing hydraulic rams as the extraction elements, the invention is not limited to this particular arrangement. For example, the extraction elements may instead be linear motors and the extraction system may comprise one or more electrical generators connected directly to the linear motors.

Whilst the coupling between each pair of body members preferably comprises the plate arrangement described in the preferred embodiment above, the invention is not limited to this particular arrangement. Any coupling may be used which allows the pair of body members to rotate relative to one another about the first and second axes of rotation. For example, a ball joint could be employed as the coupling, with restraint applied to the joint so that relative rotation of the body members about the longitudinal axis is prevented.

It is preferable that the extraction elements are connected to the second body member of each pair about a third axis of rotation which is orthogonal to the second axis about which the second body member and coupling may rotate relative to one another. However, it should be understood that the invention is not limited to this arrangement. The third axis may be parallel to the second axis, for example.

These and other modifications and improvements may be incorporated without departing from the scope of the present invention.

The invention claimed is:

1. An apparatus for extracting power from waves, the apparatus comprising:
    at least one pair of buoyant body members coupled to one another by a coupling which permits relative rotation between the buoyant body members about first and second non-parallel axes of rotation;
    a power extraction system comprising first and second pairs of power extraction elements, each power extraction element having a first end directly attached to a first of the buoyant body members and a second end directly attached to a second of the buoyant body members such that the power extraction element resists and extracts power from the relative rotation between the buoyant body members;
    wherein the first and second pairs of power extraction elements are respectively located either side of the first axis of rotation and are symmetrical with respect to the second axis of rotation; and
    wherein a lateral distance between the first pair of power extraction elements is less than a lateral distance between the second pair of power extraction elements.

2. The apparatus of claim 1, wherein each power extraction element comprises a hydraulic ram assembly having a piston rod and a cylinder, and wherein the cylinder is attached to the first buoyant body member and the piston rod is attached to the second buoyant body member.

3. The apparatus of claim 1, further comprising:
    a plurality of buoyant body members, wherein each pair of adjacent buoyant body members are coupled to one another by a coupling which permits relative rotation between the buoyant body members about two non-parallel axes of rotation; and
    a power extraction system for each coupling.

4. The apparatus of claim 1, wherein the coupling comprises a plate member located between the pair of the buoyant body members, the plate member being rotatably connected to the first buoyant body member about the first axis of rotation, and rotatably connected to the second buoyant body member about the second axis of rotation which is substantially perpendicular to the first axis of rotation.

5. The apparatus of claim 1, wherein each of the first and second ends of each power extraction element is attached to the corresponding buoyant body member such that the first and second ends may each rotate relative to their corresponding buoyant body members about third and fourth axes of rotation.

6. The apparatus of claim 2, wherein each of the buoyant body members has a longitudinal axis, and the cylinder and piston rod are attached to their respective buoyant body members such that relative axial movement is prevented between the cylinder and the first buoyant body member and between the piston rod and the second buoyant body member.

7. The apparatus of claim 3, wherein each coupled pair of buoyant body members comprises a front buoyant body member and a rear buoyant body member, and the power extraction system is located in the front buoyant body member of each coupled pair.

8. The apparatus of claim 4, wherein the plate member includes an aperture and the apparatus further comprises at least one cabling conduit connecting the buoyant body members through the aperture.

9. The apparatus of claim 8, wherein the aperture is co-axial with a longitudinal axis of the apparatus.

10. The apparatus of claim 5, wherein the third axis of rotation is substantially orthogonal to the second axis of rotation, and wherein the second end of each power extraction element is pivotably attached to the second buoyant body member about the third axis of rotation.

11. An apparatus for extracting power from waves, the apparatus comprising:
    at least one pair of buoyant body members coupled to one another by a coupling which permits relative rotation between the buoyant body members about first and second non-parallel axes of rotation;
    a power extraction system comprising first and second pairs of power extraction elements, each power extraction element having a first end connected to a first of the buoyant body members and a second end connected to a second of the buoyant body members such that the power extraction element resists and extracts power from the relative rotation between the buoyant body members;
    wherein the first and second pairs of power extraction elements are respectively located either side of the first axis of rotation and are symmetrical with respect to the second axis of rotation; and
    wherein a lateral distance between the first pair of power extraction elements is less than a lateral distance between the second pair of power extraction elements, and
    wherein the coupling comprises a plate member located between the pair of buoyant body members, the plate member being rotatably attached to the first buoyant body member about the first axis of rotation, and rotatably connected to the second buoyant body member about the second axis of rotation which is substantially perpendicular to the first axis of rotation.

12. The apparatus of claim 11, wherein each of the power extraction elements comprises a hydraulic ram assembly having a piston rod and a cylinder, and wherein the cylinder is connected to the first buoyant body member and the piston rod is connected to the second buoyant body member.

13. The apparatus of claim 11, wherein the plate member includes an aperture and the apparatus further comprises at least one cabling conduit connecting the buoyant body members through the aperture.

14. The apparatus of claim 11, wherein each of the first and second ends of each of the power extraction elements is attached to the corresponding buoyant body member such that the first and second ends may each rotate relative to the corresponding buoyant body members about third and fourth axes of rotation.

15. The apparatus of claim 12, wherein each of the buoyant body members has a longitudinal axis, and the cylinder and piston rod are connected to their respective buoyant body members such that relative axial movement is prevented between the cylinder and first buoyant body member and between the piston rod and the second buoyant body member.

16. The apparatus of claim 13, wherein the aperture is co-axial with a longitudinal axis of the apparatus.

17. The apparatus of claim 14, wherein the third axis of rotation is substantially orthogonal to the second axis of rotation, and wherein the second end of each of the power extraction elements is pivotably connected to the second buoyant body member about the third axis of rotation.

18. An apparatus for extracting power from waves, the apparatus comprising:
  at least one pair of buoyant body members coupled to one another by a coupling which permits relative rotation between the buoyant body members about first and second non-parallel axes of rotation;
  a power extraction system comprising first and second pairs of power extraction elements, each power extraction element having a first end connected to a first of the buoyant body members and a second end connected to a second of the buoyant body members such that the power extraction element resists and extracts power from the relative rotation between the buoyant body members;
  wherein the first and second pairs of power extraction elements are respectively located either side of the first axis of rotation and are symmetrical with respect to the second axis of rotation; and
  wherein a lateral distance between the first pair of power extraction elements is less than a lateral distance between the second pair of power extraction elements,
  wherein each of the first and second ends of each of the power extraction elements is connected to the corresponding buoyant body member such that the first and second ends may each rotate relative to the corresponding buoyant body members about third and fourth axes of rotation,
  wherein the third axis of rotation is substantially orthogonal to the second axis of rotation, and wherein the second end of each power extraction element is pivotably connected to the second buoyant body member about the third axis of rotation.

* * * * *